(12) United States Patent
Liao et al.

(10) Patent No.: US 12,421,131 B2
(45) Date of Patent: Sep. 23, 2025

(54) PREPARATION METHOD FOR SPHERICAL Zn—Mn METAL COMPOUND

(71) Applicant: Jinggangshan University, Ji'an (CN)

(72) Inventors: Wenming Liao, Ji'an (CN); Haihui Chen, Ji'an (CN); Junyue Lin, Ji'an (CN); Xiaobing Liu, Ji'an (CN); Renyun Kuang, Ji'an (CN); Tingting Ma, Ji'an (CN)

(73) Assignee: Jinggangshan University, Ji'an (CN)

( * ) Notice: Subject to any disclaimer, the term of this patent is extended or adjusted under 35 U.S.C. 154(b) by 477 days.

(21) Appl. No.: 18/098,546

(22) Filed: Jan. 18, 2023

(65) Prior Publication Data

US 2023/0331580 A1 Oct. 19, 2023

(30) Foreign Application Priority Data

Apr. 14, 2022 (CN) .......................... 202210389708.5

(51) Int. Cl.
*C01G 45/22* (2025.01)
(52) U.S. Cl.
CPC .......... *C01G 45/22* (2025.01); *C01P 2004/32* (2013.01)
(58) Field of Classification Search
None
See application file for complete search history.

(56) References Cited

PUBLICATIONS

El-Aiashy et al., Solid-solid interaction between manganese carbonate and zinc carbonate and the decomposition of $H_2O_2$ over mixed zinc-manganese oxide catalysts, material letters, vol. 24, pp. 95-101 (Year: 1995).*
Cheng et al, Zinc ion-doped carbon dots with strong yellow photoluminescence, RSC Adv, 2016, 6 (Year: 2016).*

* cited by examiner

*Primary Examiner* — Stefanie J Cohen
(74) *Attorney, Agent, or Firm* — Hawaii Patent Services; Nathaniel K. Fedde; Kenton N. Fedde

(57) ABSTRACT

The present invention discloses a preparation method for a spherical Zn—Mn metal compound. The preparation method comprises the following steps: adding a metal ion solution to a weak acid carbon dot solution; and then, adding a sodium carbonate solution to the above solution at an oil bath while stirring to obtain a spherical Zn—Mn metal carbonate compound. The present invention proposes that using water-soluble or ethanol-soluble carbon dots as a carrier and polyvinylpyrrolidone as a surfactant to prepare the spherical Zn—Mn metal compound, a novel preparation method for the Zn—Mn metal compound is formed. The prepared material may be applied to a lithium ion battery and may further be applied to application researches in the field of synthesis of other electrochemical energy sources or photocatalytic materials.

7 Claims, 3 Drawing Sheets

PREPARATION METHOD FOR SPHERICAL Zn—Mn METAL COMPOUND

TECHNICAL FIELD

The present invention belongs to the field of synthesizing novel clean energy materials, and particularly relates to a preparation method for a spherical Zn—Mn double metal compound.

BACKGROUND

Nowadays, excess energy consumption causes the environmental problems, which makes people actively develop new energy and clean renewable resources. As a kind of rechargeable energy storage electrochemical devices, a lithium ion battery possesses many advantages such as high efficiency, convenience, safety, no pollution, high specific capacity, no memory effect, low self-discharge and long cycle life. However, how to further improve specific energy of the whole battery is a main problem. It is noteworthy to develop an anode material with high specific capacity as a main material of the battery. Compared with a conventional carbon material, a metal oxide has the advantages of high specific capacity and good reversibility, shows most potential advantage, and thus is applied to a commercial lithium ion battery. A porous micro-nano structure may effectively improve a lithium-storage interface of the metal oxide, thus improving the lithium-storage electrochemical performance of the material.

During the preparation process of a lithium-storage metal compound in a liquid-phase method, metal ions require a certain adsorption carrier when being dissolved into liquid and then are prone to forming a porous micro-nano structure metal compound of a uniform morphological structure. However, it is often difficult to make a precursor be stably formed that a surfactant is simply added as a morphological structure template.

SUMMARY

A primary objective of the present invention is to provide a preparation method of constructing a spherical Zn—Mn metal compound with assistance of carbon dots, so as to overcome the shortcomings in the prior art. Specifically, A preparation method for a spherical Zn—Mn metal compound comprises the following steps:
dissolving a zinc ion compound and a manganese ion compound into water to form a metal ion solution, and adding the metal ion solution to a carbon dot solution for stirring for 1-120 h; and then, adding a sodium carbonate solution to the above solution at an oil bath of 30-100° C. while stirring, conducting heat preservation for 1-120 h to form suspended solids, and centrifuging precipitates to obtain a spherical Zn—Mn metal carbonate compound, wherein
the carbon dot solution is prepared in the following process: adding acid to adjust a pH value of a water-soluble carbon dot solution or an ethanol carbon dot solution to 7 or a weak acid state, and adding polyvinylpyrrolidone to form a transparent solution.

In the present invention, a simple synthetic method is provided for preparing the spherical Zn—Mn metal compound which may serve as a potential anode material for a research on performance of a lithium ion battery. In this method, carbon dots are dispersed in water in a form of soluble particles, contain a great amount of oxygen-rich functional groups on the surfaces, have excellent chemical activity and may form a bonding effect to ions, which improves the stability of a material synthesis system and assists to construct a metal compound of a uniform morphological structure. The carbon dots are embodied in adsorbing and supporting the metal ions and making combined action with amphiphilic high-polymer polyvinylpyrrolidone, which facilitates formation of the Zn—Mn metal compound of a relatively uniform morphological structure.

Preferably, the preparation process of the water-soluble carbon dot solution and the ethanol carbon dot solution comprises the following steps: dissolving lithium hydroxide or sodium hydroxide into water as an eletrolyte, adding ethanol into the electrolyte as the sources of carbon dots, electrolyzing a mixed solution with a platinum metal, conducting centrifugation and filtering to obtain the water-soluble carbon dot solution; or conducting centrifugation, filtering and drying, and dissolving resultant precipitates into ethanol to obtain the ethanol carbon dot solution. Specifically, lithium hydroxide monohydrate (or sodium hydroxide) are dissolved into deionized water to form an aqueous solution, ethanol is added, and a mixed solution is electrolyzed with double platinum electrodes; and electrolyzation is conducted at a voltage of 10-30 V to prepare the water-soluble carbon dot solution, or precipitates formed after centrifugation are dried and then dissolved into the ethanol again to form the ethanol carbon dot solution.

Preferably, the preparation method further comprises: in an air atmosphere or a protective gas atmosphere, sintering a prepared precursor at 300-1100° C.

Preferably, in the metal ion solution, a molar concentration of zinc ions and manganese ions is 0.1-5 M; the zinc ion compound is one of zinc chloride, zinc sulfate, zinc nitrate and zinc acetate; and the manganese ion compound is one of manganese chloride, manganese sulfate, manganese nitrate and manganese acetate.

Preferably, a molar mass ratio of metal ions to sodium carbonate is 1 to (1-15).

Preferably, acid is one or more of hydrochloric acid, acetic acid, nitric acid and sulfuric acid.

Preferably, the polyvinylpyrrolidone has a molecular weight of 8000-700000; and the transparent solution formed after addition of the polyvinylpyrrolidone has a concentration of 0.5-20 g/L.

Preferably, the water-soluble carbon dot solution or the ethanol carbon dot solution has a concentration of 0.01-10 mol/L.

The present invention has the beneficial effects that the present invention proposes that, using water-soluble carbon dots as a carrier and the polyvinylpyrrolidone as a surfactant to prepare the spherical Zn—Mn metal compound, a novel preparation method for the Zn—Mn metal compound is formed. The prepared material may be applied to a lithium ion battery and may further be applied to application researches in the field of synthesis of other electrochemical energy sources or photocatalytic materials.

DETAILED DESCRIPTION

The purposes, the solutions and the effects of the present invention will be fully understood from clear and thorough description of the concept and the resultant technical effects of the present invention taken together with the embodiments and the accompanying drawings below.

Embodiment 1

Figure 1:
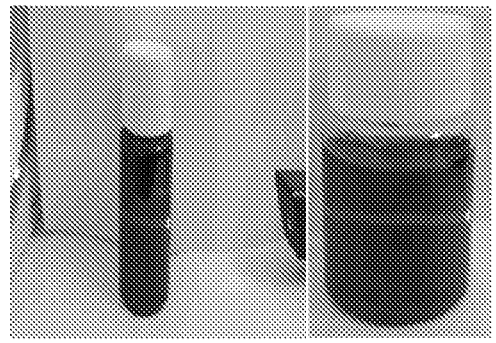
FIG. 1 is a diagram showing digital photos of an aqueous solution for soluble carbon dots, which is prepared using a LiOH alkaline solution in embodiment 1.
Figure 3:
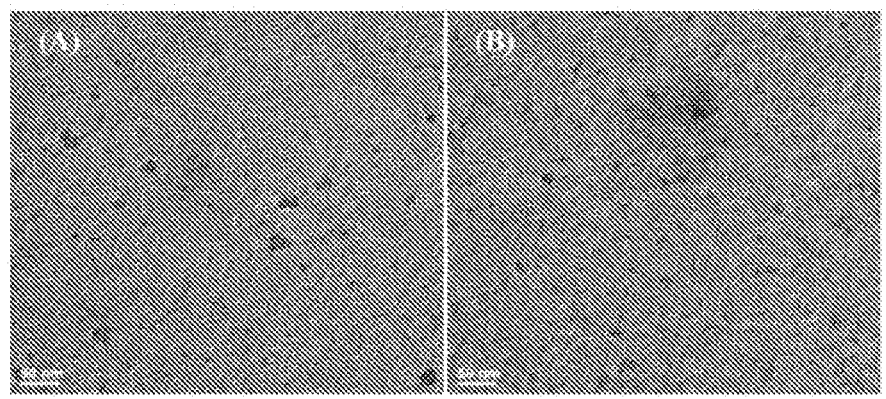
FIG. 3 is a diagram showing transmission electron microscope (TEM) images of soluble carbon dots.

2.5172 g of lithium hydroxide monohydrate was weighed and dissolved into 60 mL of deionized water to form an aqueous solution (i.e. 1 M LiOH aqueous solution), then 15 mL of ethanol was added, a voltage of 15 V was applied for 3 h, and high-speed centrifugation and filtering were conducted to separate and extract out a brownish red transparent water-soluble carbon dot solution, as shown in FIG. 1. TEM images are shown in FIG. 3.

The prepared brownish red transparent water-soluble carbon dot solution was dissolved into 200 mL of deionized water, 2 mL of acetic acid was added to make a whole system be in a weak acid state, and 1 g of polyvinylpyrrolidone (PVP, having a molecular weight of 30000-40000) was added as a surfactant to form a 250 mL of carbon dot aqueous solution. 2.451 g of (10 mmol) manganese acetate tetrahydrate and 1.0997 g of (5 mmol) zinc acetate dihydrate were weighed and dissolved into the above aqueous solution; and then, a mixed solution was treated in an oil bath at 40° C., 100 mL of 1 M sodium carbonate solution was added to the above solution dropwise while continuously stirring, and continuous stirring was conducted for 15 h, so as to form stable Zn—Mn metal compound precipitates. Finally, the precipitates were centrifuged and cleaned repeatedly until a pH value was neutral.

Figure 4:
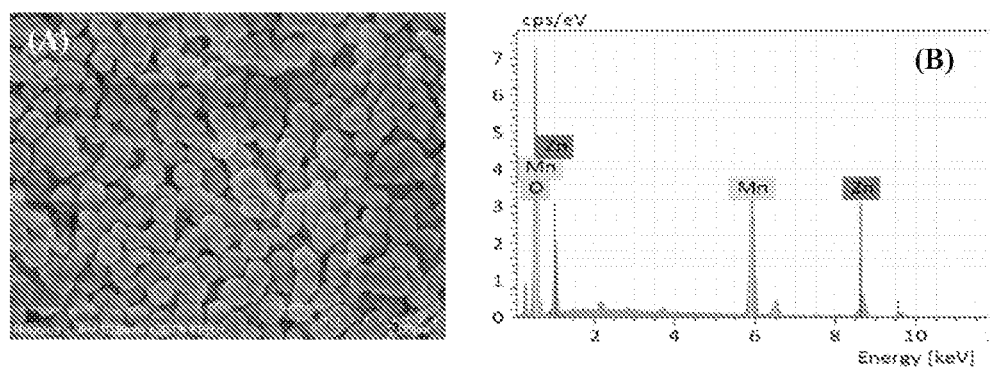
FIG. 4 is a diagram showing scanning electron microscope (SEM) images and an X-ray spectroscopy elemental analysis (EDS) image of a spherical Zn—Mn metal compound obtained in embodiment 1.

By centrifuging and drying obtained suspended solids (i.e. the Zn—Mn metal compound) and making microscopic analysis with a scanning electron microscope, it can be known that the material is of a spherical structure with a uniform structure and morphology, referring to FIG. 4 (A, B).

From X-ray spectroscopy analysis on the obtained suspended solids (i.e. the Zn—Mn metal compound), it can be known that the material contains elements such as manganese, zinc and oxygen, wherein a molar ratio of the zinc to the manganese approaches 1 to 2, as shown in FIG. 4C.

Embodiment 2

2.5172 g of lithium hydroxide monohydrate was weighed and dissolved into 60 mL of deionized water to form an aqueous solution (i.e. 1 M LiOH aqueous solution), then 5 mL of ethanol was added, a voltage of 30 V was applied for 5 h, and high-speed centrifugation and filtering were conducted to separate and extract out a brownish red transparent water-soluble carbon dot solution, as shown in FIG. 1. TEM images are shown in FIG. 3.

The prepared brownish red transparent water-soluble carbon dot solution was dissolved into 200 mL of deionized water, 2 mL of acetic acid was added to make a whole system be in a weak acid state, and 0.5 g of polyvinylpyrrolidone (PVP, having a molecular weight of 8000) was added as a surfactant to form 250 mL of carbon dot aqueous solution. 10 mmol manganese chloride and 5 mmol zinc nitrate were weighed and dissolved into the above aqueous solution; and then, a mixed solution was treated in an oil bath at 30° C., 100 mL of 0.15 M sodium carbonate solution was added to the above solution dropwise while continuously stirring, and continuous stirring was conducted for 1 h, so as to form stable Zn—Mn metal compound precipitates. Finally, the precipitates were centrifuged and cleaned repeatedly until a pH value was neutral.

Figure 5:
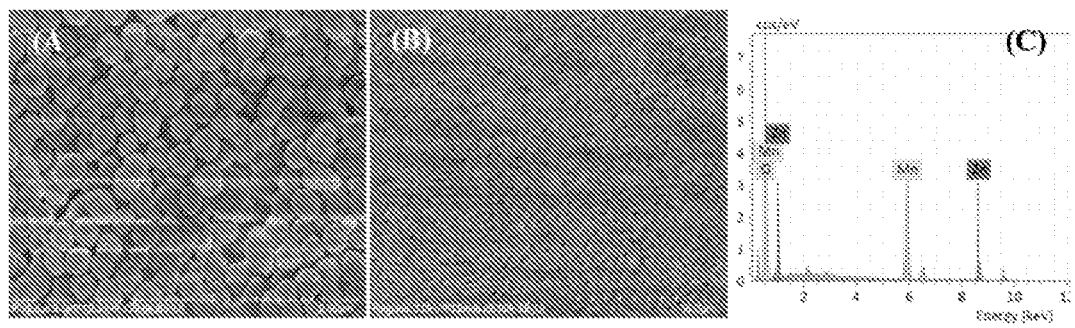
FIG. 5 is a diagram showing a scanning electron microscope (SEM) image and a EDS image of a spherical Zn—Mn metal compound obtained in embodiment 2.

By centrifuging and drying obtained suspended solids (i.e. the Zn—Mn metal compound) and making microscopic analysis with a scanning electron microscope, it can be known that the material is of a spherical structure with a uniform structure and morphology, referring to FIG. 5A.

From X-ray spectroscopy analysis on the obtained suspended solids (i.e. the Zn—Mn metal compound), it can be known that the material contains elements such as manganese, zinc and oxygen, as shown in FIG. 5B.

Embodiment 3

Figure 2:
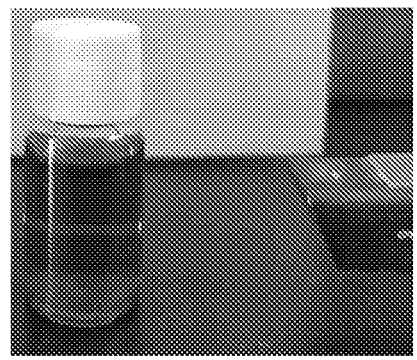
FIG. 2 is a diagram showing a digital photo of an ethanol solution for soluble carbon dots, which is prepared using a NaOH alkaline solution in embodiment 3.

2.4 g of sodium hydroxide monohydrate was weighed and dissolved into 60 mL of deionized water to form 1 M NaOH aqueous solution; then 10 mL of ethanol was added; a voltage of 10 V was applied for 6 h, and high-speed centrifugation and filtering separation were conducted to leave precipitates; the precipitates were dried and put in ethanol for full dissolution to form a brownish red transparent carbon dot ethanol solution, as shown in FIG. 2.

The prepared brownish red transparent carbon dot solution was dissolved into 100 mL of deionized water, 1 mL of hydrochloric acid was added to make a whole system be in a weak acid state, and 1.5 g of polyvinylpyrrolidone (PVP, having a molecular weight of 700000) was added as a surfactant. 10 mmol manganese chloride and 5 mmol zinc sulfate were weighed and dissolved into the above aqueous solution; and then, a mixed solution was treated in an oil bath at 100° C., 2000 mL of 1.5 M sodium carbonate solution was added to the above solution dropwise while continuously stirring, and continuous stirring was conducted for 120 h, so as to form stable Zn—Mn metal compound precipitates. After that, the precipitates were centrifuged and cleaned repeatedly until a pH value was neutral. Finally, the precipitates were sintered at an air atmosphere.

Figure 6:
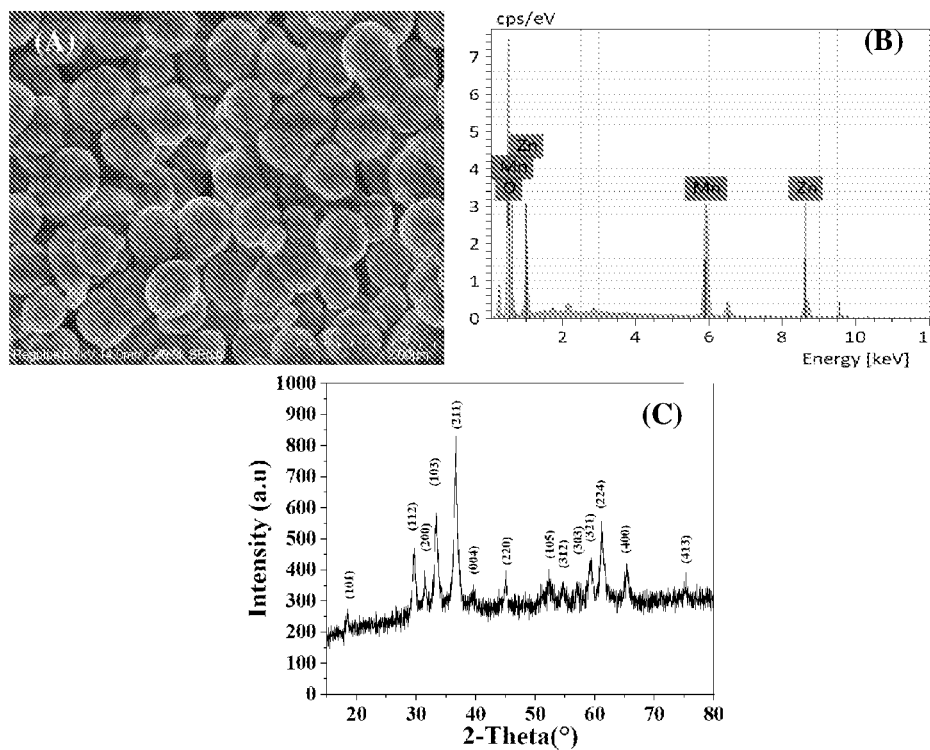
FIG. 6 is a diagram showing a scanning electron microscope (SEM) image and a EDS image of a spherical Zn—Mn metal compound and XRD pattern of $ZnMn_2O_4$ obtained in embodiment 3.

By centrifuging and drying obtained suspended solids (i.e. the Zn—Mn metal compound) and making microscopic analysis with a scanning electron microscope, it can be known that the material is of a spherical structure with a uniform structure and morphology, referring to FIG. 6A.

From X-ray spectroscopy analysis on the obtained suspended solids (i.e. the Zn—Mn metal compound), it can be known that the material contains elements such as manganese, zinc and oxygen, as shown in FIG. 6B.

Reference 1

In a reference experiment 1 conducted in comparative example 1, 2 mL of acetic acid was added to 250 mL of deionized water, to make a whole system be in a weak acid state, and 0.5 g of polyvinylpyrrolidone (PVP, having a molecular weight of 30000-40000) was added as a surfactant. 2.451 g of (10 mmol) manganese acetate tetrahydrate and 1.0997 g of (5 mmol) zinc acetate dihydrate were weighed and dissolved into the above aqueous solution; and then, a mixed solution was treated in an oil bath at 40° C., 100 mL of 1 M sodium carbonate solution was added to the above solution dropwise while continuously stirring, and continuous stirring was conducted for 15 h, so as to form stable Zn—Mn metal compound precipitates. Finally, the precipitates were centrifuged and cleaned repeatedly until a pH value was neutral.

Figure 7:
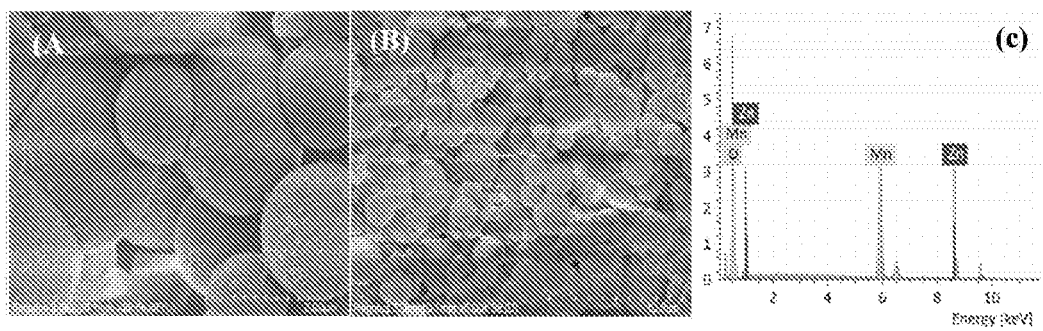
FIG. 7 is a diagram showing scanning electron microscope (SEM) images and a EDS image of a spherical Zn—Mn metal compound obtained in Reference 1.

By centrifuging and drying obtained suspended solids (i.e. the Zn—Mn metal compound) and making microscopic analysis with a scanning electron microscope, it can be known that nanospheres are very uneven and are wide in size range, referring to FIG. 7 (A, B).

From X-ray spectroscopy analysis on the obtained suspended solids (i.e. the Zn—Mn metal compound), it can be known that the material contains elements such as manganese, zinc and oxygen, wherein a molar ratio of the zinc to the manganese approaches 1 to 2, as shown in FIG. 7C.

The above are only preferred embodiments of the present invention, and the present invention is not limited to the above embodiment. As long as the embodiments achieves the technical effects of the present invention with same measures, the embodiments should be considered within the protection scope of the present invention. Various modifications and variations can be made on the technical solutions and/or the embodiments within the protection scope of the present invention.

The invention claimed is:

1. A preparation method for a spherical Zn—Mn metal compound, comprising the following steps:
dissolving a zinc ion compound and a manganese ion compound into water to form a metal ion solution, and adding the metal ion solution to a carbon dot solution for stirring for 1-120 h; and then, adding a sodium carbonate solution to the above solution at an oil bath at 30-100° C. while stirring, conducting heat preservation for 1-120 h to form suspended solids, and centrifuging precipitates to obtain a spherical Zn—Mn metal carbonate compound, wherein
the carbon dot solution is prepared in the following process: adding acid to adjust a pH value of a water-soluble carbon dot solution or an ethanol carbon dot solution to 7 or a weak acid state, and adding polyvinylpyrrolidone to form a transparent solution.

2. The preparation method according to claim 1, wherein the preparation process of the water-soluble carbon dot solution and the ethanol carbon dot solution comprises the following steps: dissolving lithium hydroxide or sodium hydroxide into water as an eletrolyte, adding ethanol into the electrolyte as the sources of carbon dots, electrolyzing a mixed solution with a platinum metal, conducting centrifugation and filtering to obtain the water-soluble carbon dot solution; or conducting centrifugation, filtering and drying, and dissolving resultant precipitates into ethanol to obtain the ethanol carbon dot solution.

3. The preparation method according to claim 1, wherein in the metal ion solution, a molar concentration of zinc ions and manganese ions is 0.1-2 M; the zinc ion compound is one of zinc chloride, zinc sulfate, zinc nitrate and zinc acetate; and the manganese ion compound is one of manganese chloride, manganese sulfate, manganese nitrate and manganese acetate.

4. The preparation method according to claim 1, wherein a molar mass ratio of metal ions to sodium carbonate is 1 to (1-15).

5. The preparation method according to claim 1, wherein acid is one or more of hydrochloric acid, acetic acid, nitric acid and sulfuric acid.

6. The preparation method according to claim 1, wherein the polyvinylpyrrolidone has a molecular weight of 8000-700000; and the transparent solution formed after addition of the polyvinylpyrrolidone has a concentration of 0.5-20 g/L.

7. The preparation method according to claim 1, wherein the water-soluble carbon dot solution or the ethanol carbon dot solution has a concentration of 0.01-10 mol/L.

* * * * *